Patented June 11, 1929.

1,716,972

UNITED STATES PATENT OFFICE.

HENRY MONTAGUE MINES, OF LIVERPOOL, ENGLAND, ASSIGNOR TO FREDERICK CURD, OF LONDON, ENGLAND.

PHOSPHORESCENT OR LUMINOUS MASS OR COMPOUND.

No Drawing. Application filed May 10, 1926, Serial No. 108,174, and in Great Britain May 18, 1925.

Coloured phosphorescent light mainly depends upon a re-arrangement of the molecular construction of the mineral matters employed, and is due to the presence of known quantities of other inorganic matter introduced into the material before heat treatment.

For the purpose of producing phosphorescent masses it has been previously proposed to use alkaline earths, all of which possess the property of being naturally phosphorescent, and there have been produced compositions of strontium, barium, or calcium, capable of emitting a more or less ill-defined coloured phosphorescent glow after exposure to sunlight, but such compositions largely lose their phosporescent properties when ground sufficiently fine to be made into paint.

A phosphorescent or luminous mass or compound, according to the present invention, may be relied upon for durability, intensity and definite colour of phosphorescent light; it is highly sensitive to artificial light, and does not rely solely upon sunlight or daylight for the energy which it is capable of absorbing and emitting in the form of particular light vibrations during periods of darkness; moreover it does not lose its phosphorescent properties when ground sufficiently fine to mix as a paint.

A phosphorescent or luminous mass or compound, according to my invention, includes a base composition (hereinafter referred to as "base") comprising:—

Approximately
{
40 parts by weight strontium carbonate
10 parts by weight calcium carbonate
2 parts by weight magnesium carbonate
2 parts by weight aluminium carbonate
1 part by weight lithium carbonate
0.5 part by weight rubidium carbonate
}

With said base is incorporated suitable carbonaceous matter in any suitable form, such as approximately 4% by weight of ground starch, 30% to 50% by weight of sulphur, and a very small amount of one or more compounds of thallium, thorium, uranium, bismuth, silver, or nickel, together with one or more compounds of sodium, potassium, manganese, barium, or calcium. The compounds of thallium, thorium, uranium, bismuth, silver and nickel are hereinafter referred to as "phosphorogens", and the compounds of sodium, potassium, manganese, barium and calcium, as "luminophores".

The compound is finally heat-treated.

In some cases the compound is then ground, additional luminophores are added, and the compound is re-heated.

It may be here stated that a phosphorogen when introduced as an impurity into said base (which must be pure) in a finely divided state, may be considered to be directly responsible for the phenomenon of phosphorescence, it acting in some way as a light emission centre. A luminophore, by acting as a flux, will convey the phosphorogens throughout the entire compound when subjected to heat treatment.

The phosphorogens in combination with the luminophores are supposed to be responsible for the colour of the phosphorescent light which luminous masses are capable of emitting.

EXAMPLE 1.

*For the production of a luminous mass giving a violet phosphorescent light.*

Approximately
{
50 parts by weight base
0.25 part by weight sodium chloride ⎫
0.25 part by weight potassium chloride ⎬ luminophores.
0.1 part by weight manganese chloride ⎭
0.001 part by weight thorium nitrate ⎫ phosphorogens.
0.002 part by weight bismuth nitrate ⎭
2 parts by weight carbonaceous matter (such as starch)
50 parts by weight sulphur
} heated in closed crucible for 30 to 90 minutes at temperature of about 1250° C., or, alternatively, heated for twice the time at a temperature of about 625° C.

Example 2.

*For production of luminous mass giving blue phosphorescent light.*

Approximately
- 50 parts by weight base
- 0.5 part by weight sodium sulphate } luminophores.
- 0.5 part by weight potassium sulphate
- 0.002 part by weight bismuth nitrate or sulphate } phosphorogens.
- 15 parts by weight sulphur
- 2 parts by weight carbonaceous matter (such as starch)

heated in closed crucible for 30 to 90 minutes at temperature of about 650° C.

Example 3.

*For production of luminous mass giving indigo phosphorescent light.*

Approximately
- 50 parts by weight base
- 0.5 part by weight sodium hyposulphate } luminophores.
- 0.5 part by weight potassium bichromate
- 0.25 part by weight calcium fluoride } phosphorogen.
- 0.002 part by weight bismuth nitrate
- 15 parts by weight sulphur
- 2 parts by weight carbonaceous matter (such as starch)

heated in closed crucible for 30 to 90 minutes at temperature of from about 500° C., to about 600° C.

Example 4.

*For production of luminous mass giving green phosphorescent light.*

Approximately
- 50 parts by weight base
- 1.5 parts by weight barium sulphate or sulphide } luminophores.
- 1 part by weight sodium sulphate
- 0.001 part by weight thorium nitrate } phosphorogens.
- 0.001 part by weight thallium nitrate
- 20 parts by weight sulphur
- 2 parts by weight carbonaceous matter (such as starch)

heated in closed crucible for 30 to 90 minutes at temperature of from about 750° C. to 800° C.

Example 5.

*For production of luminous mass giving yellow phosphorescent light.*

Approximately
- 50 parts by weight base
- 0.25 part by weight sodium chloride } luminophores.
- 1 part by weight sodium carbonate
- 0.1 part by weight manganese chloride
- 0.001 part by weight thorium nitrate } phosphorogens.
- 0.001 part by weight uranium nitrate
- 20 parts by weight sulphur
- 2 parts by weight carbonaceous matter (such as starch)

heated in closed crucible for 30 to 90 minutes at temperature of about 750° C.

Example 6.

*For production of luminous mass giving orange phosphorescent light.*

Approximately
- 50 parts by weight base
- 0.25 part by weight sodium chloride } luminophores.
- 0.25 part by weight potassium chloride
- 0.2 part by weight manganese chloride
- 0.001 part by weight uranium nitrate } phosphorogens.
- 0.001 part by weight thorium nitrate
- 50 parts by weight sulphur
- 2 parts by weight carbonaceous matter (such as starch)

heated in closed crucible for 30 to 90 minutes at temperature of about 1300° C.

EXAMPLE 7.

*For production of luminous mass giving red phosphorescent light.*

Approximately
$\begin{cases} 50 \text{ parts by weight base} \\ 1 \text{ part by weight sodium fluoride} \\ 0.01 \text{ part by weight manganese sulphate} \end{cases}$ luminophores.
$\begin{cases} 0.001 \text{ part by weight nickel sulphate} \\ 0.001 \text{ part by weight silver nitrate} \end{cases}$ phosphorogens.
$\begin{cases} 20 \text{ parts by weight sulphur} \\ 2 \text{ parts by weight carbonaceous matter (such as starch)} \end{cases}$ heated in closed crucible for 30 to 90 minutes at temperature of about 800° C.

It will be understood that colours, other than said spectrum colours, may also be produced by varying combinations of phosphorogens and luminophoroes or/and by varying the temperatures and time periods of furnacing.

According to one mode of manufacture:—

The strontium and calcium carbonate are dissolved in nitric, hydrochloric or other suitable acid, and any impurities present are removed by the usual chemical processes; to the solution is added, preferably in small quantities at a time, in the form of an aqueous or slightly acidified alcoholic solution, the phosphorogen or phosphorogens, until the required quantity is present. This mixed solution is allowed to stand for a time and is then precipitated in the form of a carbonate, by the addition of ammonium carbonate, or other suitable carbonate precipitating media.

The resultant precipitate is dried and intimately mixed with the luminophores and with the other ingredients, viz: the magnesium, aluminium, lithium and ribidium carbonates.

The compound is then ground as finely as possible in order to insure thorough intermingling of the ingredients and sulphur and the suitable carbonaceous matter is thoroughly incorporated in the compound.

The compound is placed in a close crucible and furnaced at the required temperature for the required period of time.

If the compound is required to be in powdered form, it is then ground; this may have the effect of reducing its luminosity which may be restored by the addition of approximately the same quantities of luminophores as previously incorporated in the compound; the whole being again suitably heated but preferably for not longer than 20 minutes, and preferably at a temperature not greater than that of the first heat treatment.

In some cases a slight trace of sulphur may also be added.

It will be understood that providing the strontium and calcium carbonates are pure and free from contamination by other mineral matters, the whole of the ingredients (except the sulphur) may be mixed together in distilled water, dried, intimately mixed with the sulphur and furnaced as before described.

Also it will be understood that providing the strontium and calcium carbonates are pure and free from contamination by other mineral matter, the whole of the ingredients may be mixed together in a dry state—thorough incorporation being essential—and furnaced as before described.

What I claim as my invention and desire to secure by Letters Patent is:—

1. The manufacture or production of a phosphorescent or luminous mass or compound by dissolving strontium and calcium carbonates in acid; adding a phosphorogen; precipitating the mixture in the form of a carbonate; drying the precipitate and mixing therewith magnesium carbonate, aluminium carbonate, lithium carbonate, rubidium carbonate, luminophores, sulphur and carbonaceous matter and heating the compound substantially as described.

2. The manufacture or production of a phosphorescent or luminous mass or compound by dissolving strontium and calcium carbonates in acid; adding a phosphorogen; precipitating the mixture in the form of a carbonate; drying the precipitate and mixing therewith magnesium carbonate, aluminium carbonate, lithium carbonate, rubidium carbonate, luminophores, sulphur and carbonaceous matter; heating the compound grinding the compound and mixing therewith additional quantities of luminophores; and re-heating the compound substantially as described.

3. A base for a phosphorescent or luminous mass consisting of a mixture of alkaline earth and alkali metal carbonates, with strontium carbonate and calcium carbonate predominating.

4. A base for a phosphorescent or luminous mass consisting of a mixture of carbonates of strontium, calcium, magnesium, aluminum, lithium and rubidium.

5. A base for a phosphorescent or luminous mass consisting of 40 parts strontium carbonate, 10 parts calcium carbonate, 2 parts magnesium carbonate, 2 parts aluminous carbonate, one part lithium carbonate, 0.5 rubidium carbonate.

In witness whereof I have signed this specification.

HENRY MONTAGUE MINES.